Jan. 6, 1959 G. A. WEISENFELD 2,867,322
POTATO HARVESTING APPARATUS
Filed Dec. 27, 1957 7 Sheets-Sheet 1

INVENTOR.
GEORGE A. WEISENFELD,
BY
McMorrow, Berman + Davidson
ATTORNEYS.

Jan. 6, 1959    G. A. WEISENFELD    2,867,322
POTATO HARVESTING APPARATUS
Filed Dec. 27, 1957    7 Sheets-Sheet 4

INVENTOR.
GEORGE A. WEISENFELD,
BY
McMorrow, Berman & Davidson
ATTORNEYS.

Jan. 6, 1959    G. A. WEISENFELD    2,867,322
POTATO HARVESTING APPARATUS
Filed Dec. 27, 1957    7 Sheets-Sheet 5

INVENTOR.
GEORGE A. WEISENFELD,
BY
McMorrow, Berman & Davidson
ATTORNEYS.

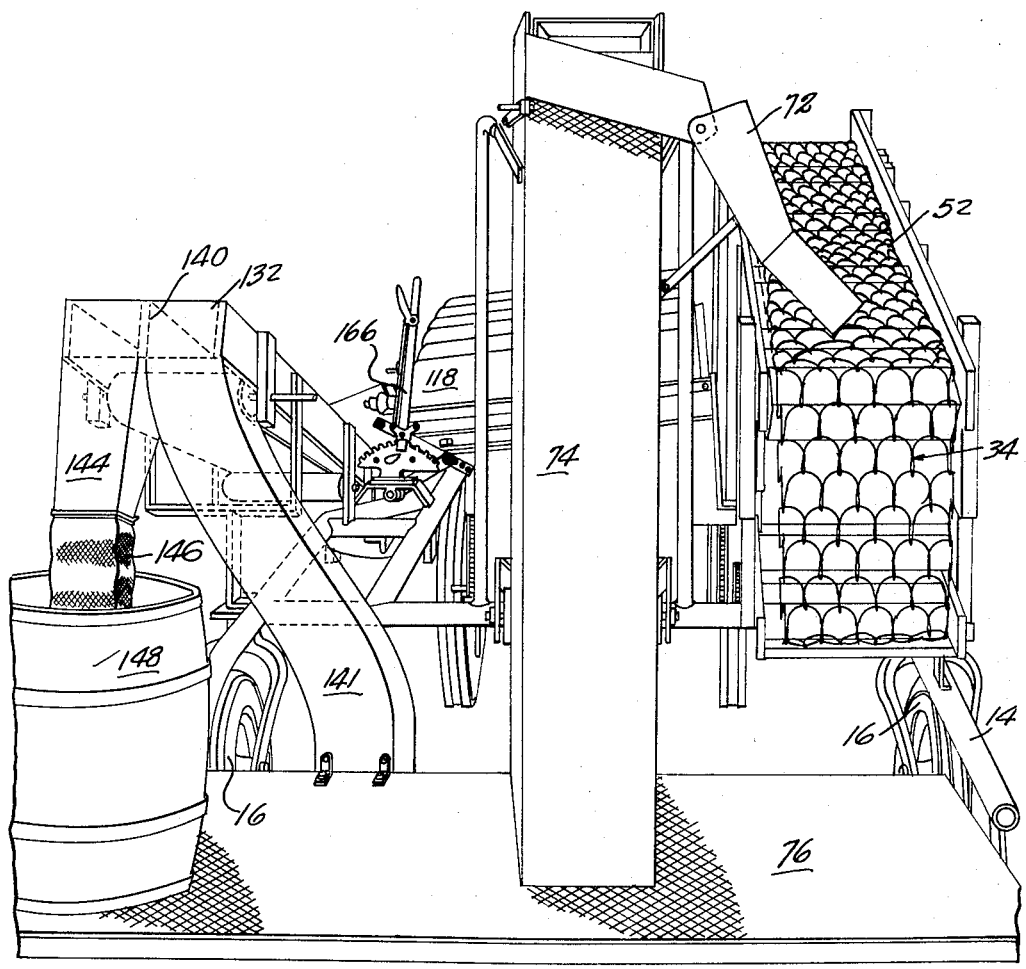

Jan. 6, 1959
G. A. WEISENFELD
2,867,322
POTATO HARVESTING APPARATUS
Filed Dec. 27, 1957
7 Sheets-Sheet 7
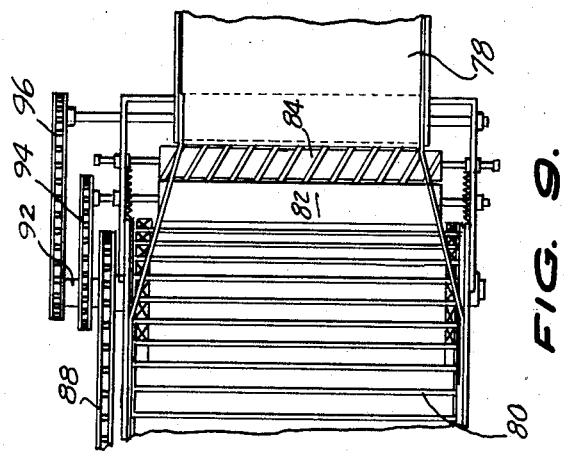
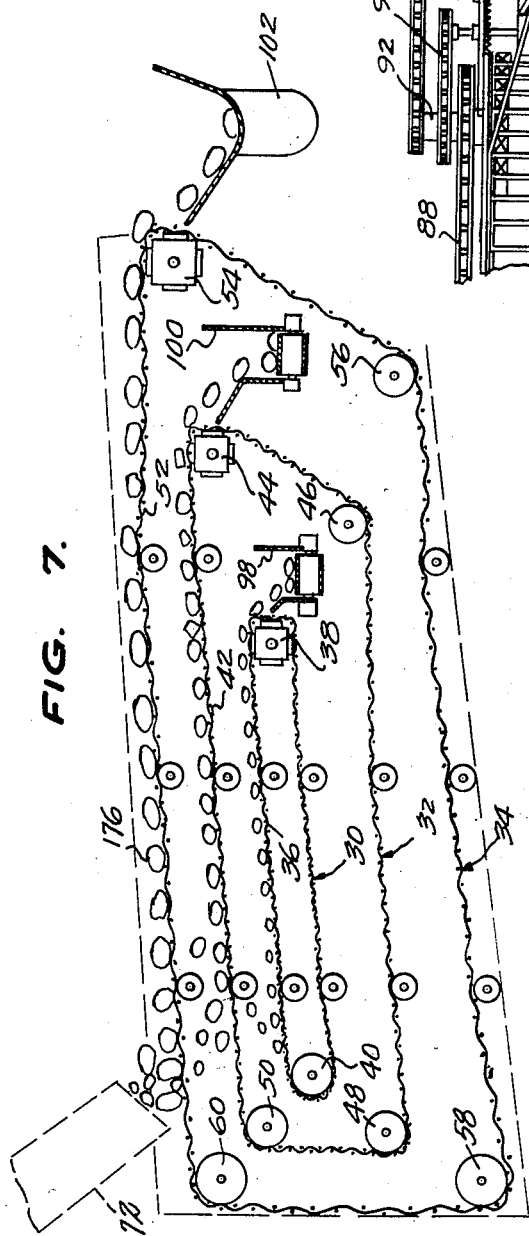
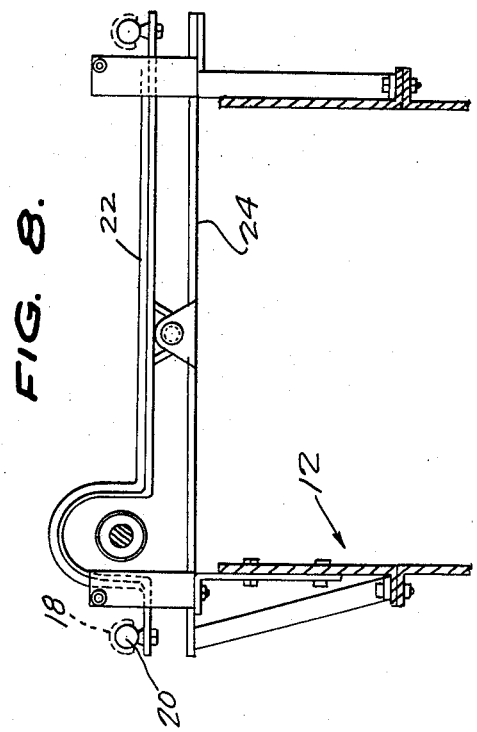
INVENTOR.
GEORGE A. WEISENFELD,
BY
McMorrow, Berman & Davidson
ATTORNEYS.

United States Patent Office 2,867,322
Patented Jan. 6, 1959

2,867,322

POTATO HARVESTING APPARATUS

George A. Weisenfeld, Breese, Ill.

Application December 27, 1957, Serial No. 705,535

4 Claims. (Cl. 209—75)

The present invention relates to a potato harvesting apparatus for use in areas where the soil contains rocks and stones the sizes of the potatoes to be harvested.

An object of the present invention is to provide a potato harvesting apparatus which lends itself to use in areas where the soil contains rocks and stones substantially the same size as the potatoes to be harvested and one which separates the potatoes from the stones as they are being harvested.

Another object of the present invention is to provide a potato harvesting apparatus which lends itself to efficient operation, one simple in structure and sturdy in construction, and one economically feasible.

These and other objects and advantages of the present invention will be fully apparent from the following description when taken in connection with the annexed drawings, in which:

Figure 6 is another isometric elevational view;

Figure 7 is a schematic view of the grading screens of the apparatus of the present invention;

Figure 8 is a fragmentary elevational view taken on the line 8—8 of Figure 5; and Figure 9 is a fragmentary plan view taken on the line 9—9 of Figure 5.

Figure 1:
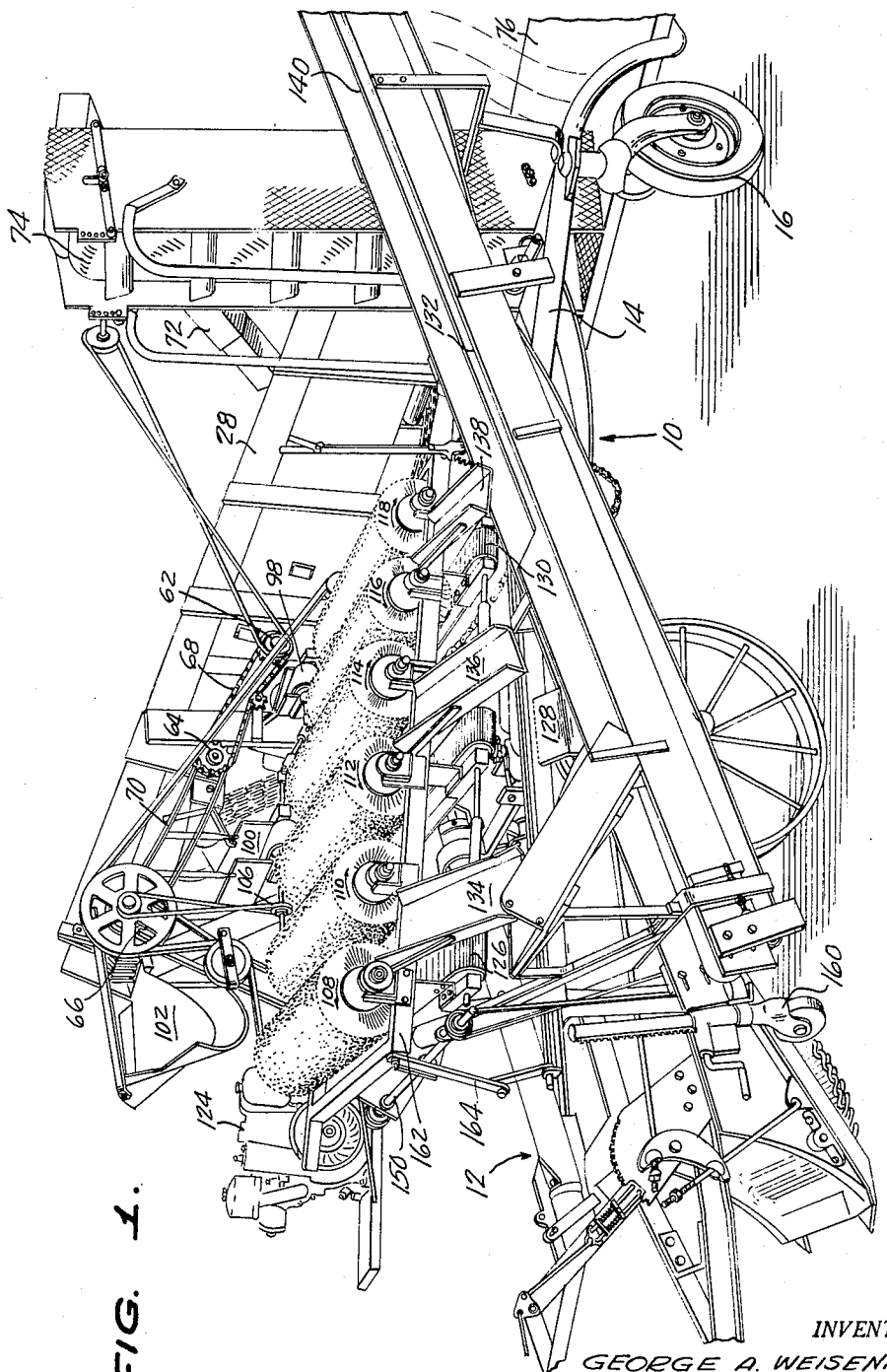
Figure 1 is an isometric elevational view of the apparatus of the present invention, shown attached to a potato digger.
Figure 2:
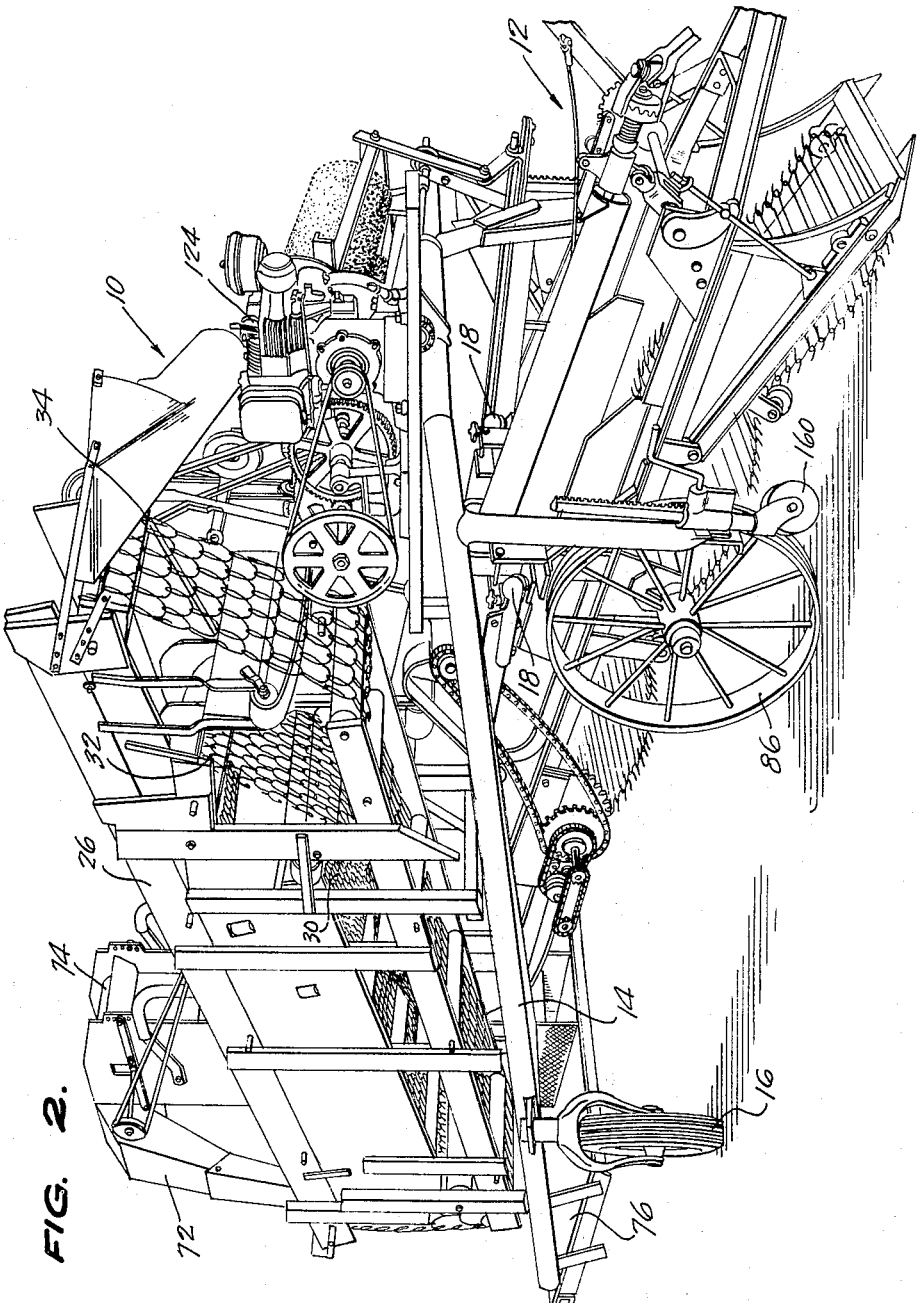
Figure 2 is another isometric elevational view of the assembly of Figure 1.

Referring in greater detail to the drawings in which like numerals indicate like parts throughout the several views, the apparatus of the present invention is designated generally by the reference numeral 10 and is shown in Figures 1 and 2 attached to a potato digger 12.

The apparatus 10 includes a mobile frame 14 supported at its rearward end by a pair of swiveling caster wheels 16 and having its front end adapted for support on the digger 12. As shown in Figure 2, a pair of hitch elements 18 project below the frame 14 and are engageable with cooperating hitch elements secured to the digger 12. This structure is shown also in Figure 8 with the hitch elements of the digger 12 indicated by the reference numeral 20 and seen to be secured on a horizontally disposed lever 22 pivotally connected intermediate its ends to a box frame 24 secured to the digger 12. A pair of vertically extending walls 26 and 28 define a conveyor housing within which are positioned three conveyors 30, 32, and 34. These conveyors are seen in schematic form in Figure 7 with the first conveyor 30 positioned upon the frame 14 so as to have its upper flight 36 substantially parallel to the frame 14 and mounted on the frame 14 traveling movement about a drive and a driven roller, 38 and 40, respectively, constituting spaced horizontal axes. The first conveyor 30 is endless as is the second conveyor 32 which has its upper flight 42 spaced above and parallel to the upper flight 36 of the first conveyor 30 and also mounted on the frame 14 for traveling movement about a drive roller 44 and spaced driven rollers 46, 48, and 50, constituting spaced horizontal axes. The third endless conveyor 34 extends about the other conveyors 30 and 32 with the conveyor 32 extending about the conveyor 30 and has its upper flight 52 spaced above and parallel to the upper flight 42 of the conveyor 32 and mounted on the frame 14 for traveling movement in the same direction as the conveyor flights 36 and 42 about a further drive roller 54 and spaced driven rollers 56, 58, and 60.

The conveyors 32 and 34 are each fabricated of an endless band of mesh material with openings in the mesh material of the conveyor 34 larger than the openings of the mesh material of the conveyor 32. The conveyor 30 is constructed of material not having openings therethrough.

Figure 5:
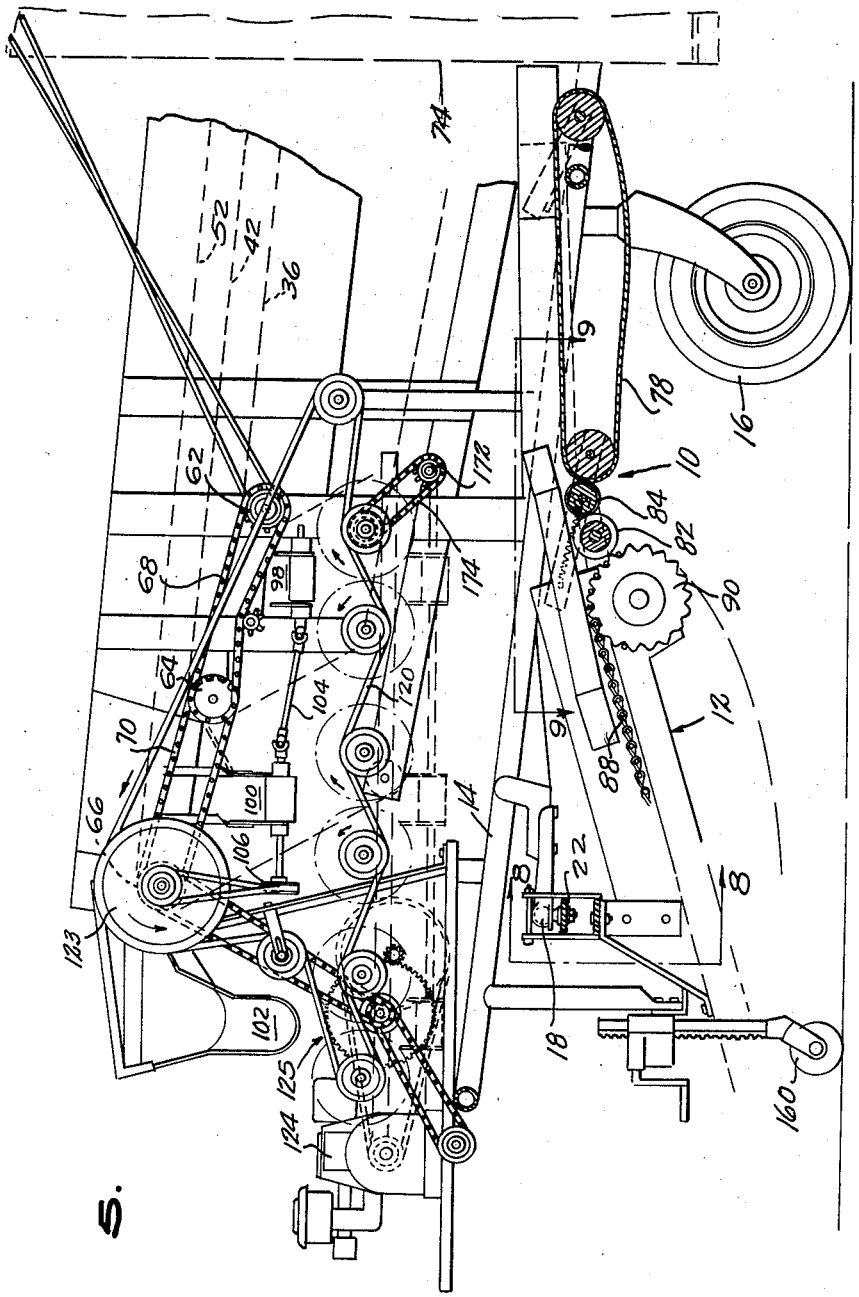
Figure 5 is a sectional view taken on the line 5—5 of Figure 3.

In Figure 5, the upper flights 36, 42, and 52, of the conveyors 30, 32, and 34, indicated in dotted lines and the drive means for such conveyors are gear and shaft assemblies 62, 64, and 66, respectively, all driven by chains 68 and 70 arranged in a conventional manner. An overhead delivery chute 72 is positioned adjacent the upper flight 52 of the conveyor 34 and has its discharge end above the upper flight 54 inwardly of and adjacent one end of the flight 54.

Conveying means is provided on the frame 14 for delivering a mass of freshly gathered potatoes having stones associated therewith to the chute 72. This conveying means includes an elevator assembly 74 rising from the rearward end of the frame 14 adjacent a platform 76 and having its upper end connecting in communication with the upper end of the chute 72, as shown in Figures 1 and 2.

The conveying means also includes, as shown in Figure 5, an endless conveyor 78 mounted below the frame 14 and having one end nearer the discharge point of the conveyor 80 of the digger 12 with intermediate rollers 82 and 84 bridging the space between the ends of the conveyors 78 and 80. A discharge point of the conveyor 78 is in communication with the interior of the elevator assembly 74.

The potato digger 12 is supported upon a pair of wheels 86 with the shaft of the wheels 86 drivingly connected to the conveyor 80 by means of a drive chain 88, shown in Figures 5 and 9, and a large sprocket wheel 90 driven by the chain 88 and in turn connected by a shaft 92 with other sprocket wheels and a chain 94 driving the one roller 82 and with another drive chain 96 connecting the shaft 92 to the drive roller of the conveyor 78.

As shown most clearly in Figures 1 and 5, the delivery end of each of the conveyors 30 and 32 is connected in communication with a short chute leading downwardly and connecting with a transverse conveyor 98 and 100, respectively. The conveyor 34 has its discharge end connected in communication with another chute 102. The conveyors 98 and 100 are drivably connected by means of a jointed shaft assembly 104 and a pulley and belt arrangement as at 106 to the one gear and shaft assembly 66.

A pair of brush rollers 108 and 110 are arranged in spaced side by side aligned relation so as to form a trough and are positioned transversely of the upper flight of the third conveyor 34 with the pair of rollers disposed so that one of the complemental ends of the rollers 108 and 110 are adjacent to and spaced below the end of the upper flight 36 of the conveyor 34 with the rollers 108 and 110 sloping downwardly from the flight 36. Other pairs of rollers 112 and 114 and rollers 116 and 118 are similarly positioned with respect to the flights 52 and 42 of the conveyors 32 and 30, respectively. The upper ends of the pair of rollers 108 and 110 are connected in communication with the discharge end of the chute 102. The upper ends of the rollers 112 and 114 are connected in communication with the conveyor 100 and the rollers 116 and 118 are similarly positioned with respect to the discharge end of the conveyor 98.

An endless belt or chain 120 connects suitably arranged pulleys 122 on each of the rollers to a main drive pulley or sprocket wheel 123 on the shaft of the gear and shaft assembly 66. The rollers rotate as shown by the arrows in Figure 5.

An internal combustion engine 124 is connected by speed reducing drive means 125 in Figure 5 to the gear and shaft assembly 66.

Other conveyors 126, 128, and 130, are positioned below the pairs of rollers 108 and 110, 112 and 114, and 116 and 118, respectively, and are adapted to deliver stones received from between the rollers to a common collecting means which is embodied in one-half of the conveyor 132. The other half of the conveyor 132 constitutes a common collecting means for potatoes received from chutes 134, 136, and 138 which have their upper ends connected in communication with the delivery end of the respective rollers.

The conveyor 132 is divided by a partition 140 and at its upper end is connected in communication with the upper ends of two chutes 142 and 144, the latter having on its lower end a cloth tube 146 leading into a barrel 148 for the reception therein of the potatoes as they are carried upwardly on one side of the conveyor 132. The lower end of the chute 142 is below the platform 76 and conveys the stones back to the ground surface as they are received from the conveyor 132.

A cross shaft 150 is mounted on the forward end of the frame 14 and has one end connected by a chain 152 to the engine 124. The other end of the cross shaft 150 carries a pulley 154 carrying a belt 156 for connecting the engine 124 to the forward roller of the conveyor 132.

A hand actuable clutch 158 is provided for disengaging the engine 124 from all of the component chains and pulleys.

Figure 3:
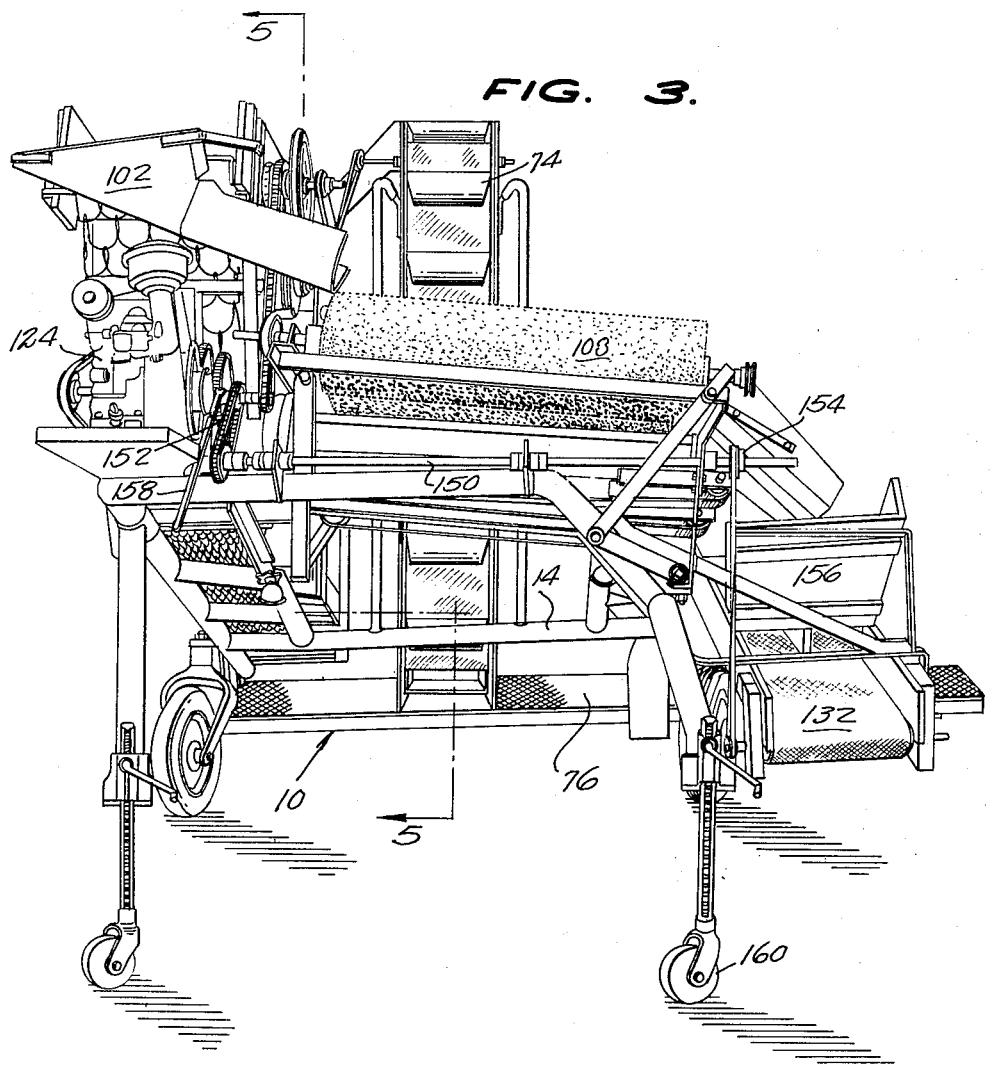
Figure 3 is a further isometric elevational view of the apparatus of the present invention, shown without the potato digger.
Figure 4:
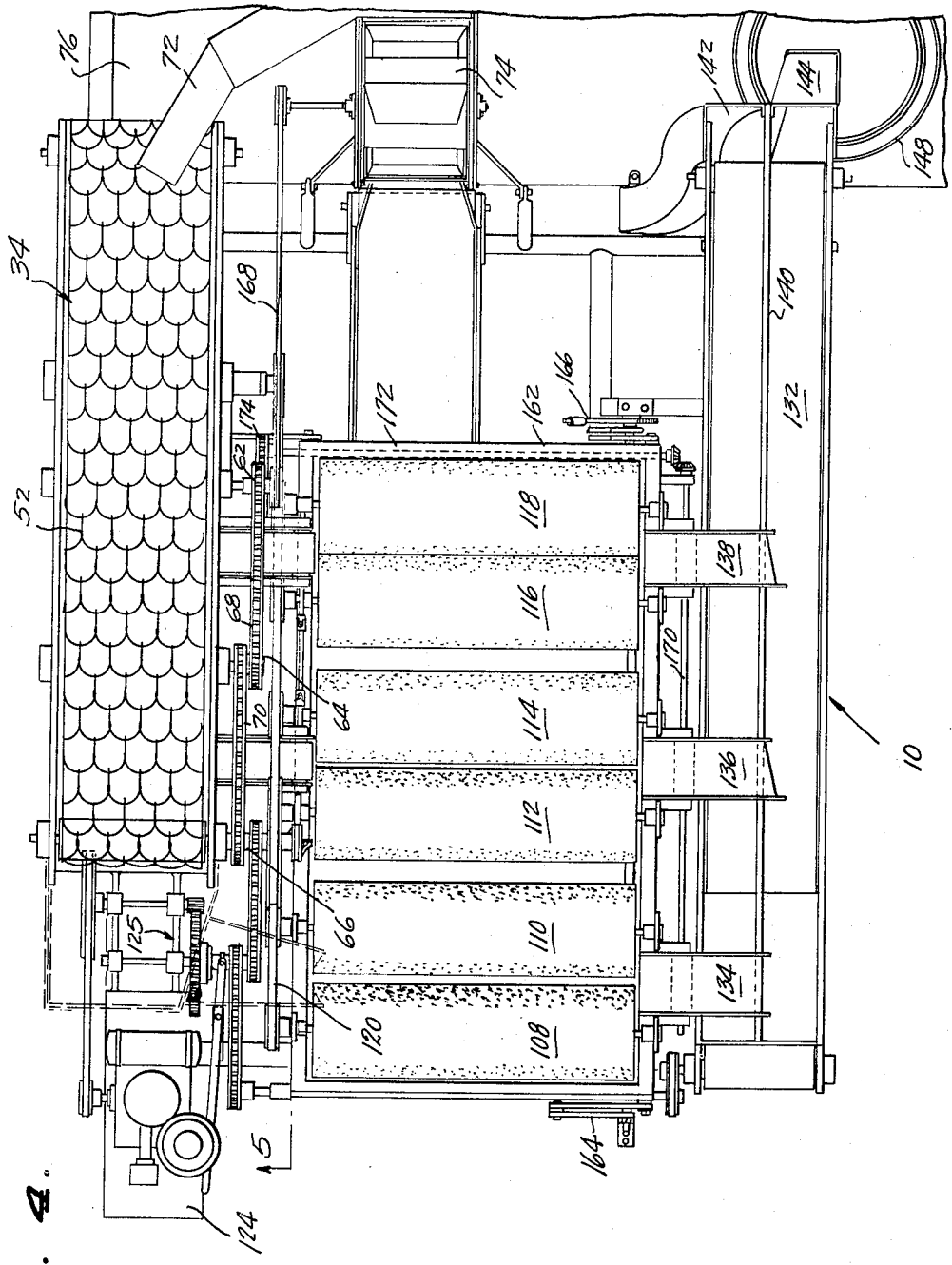
Figure 4 is a plan view with a portion broken away.

A pair of elevating caster wheels are provided, as at 160 in Figure 3, for raising the frame 14 when the digger 12 is removed from the assembly. The pairs of rollers 108, 110, 112 and 114, and 116 and 118, are all mounted within an auxiliary frame 162 which is adjustable upwardly and downwardly about a horizontal axis by means of levers 164 and 166, as shown in Figures 1 and 6.

A belt 168 drives the elevator assembly 74. The conveyors 126, 128, and 130 are driven by means of a drive shaft 170 journaled in the auxiliary frame 162 and connected by means of a shaft 172 and drive chain 174 to the main roller belt or chain 120.

In operation, the potato harvesting apparatus of the present invention is attached to the digger 12 and the latter is towed behind a tractor or other towing vehicle. The potatoes as they are removed from the ground surface together with the associates stores are carried upwardly on the digger conveyor 80 and transferred over the rollers 82 and 84 to the conveyor 78 of the apparatus. The potato and stone admixture is then carried upwardly by the elevating mechanism in the assembly 74 and delivered by the chute 72 to the upper flight 52 of the conveyor 34. As shown in Figure 7, the potatoes, as at 176, fall through the upper flight 52 of the conveyor 34 to the upper flight 42 of the conveyor 32 and to the upper flight 36 of the conveyor 30 according to their sizes. The stones are carried along with the potatoes and each portion of the graded stones and potatoes are delivered to the pairs of rollers 108, 110, rollers 112, 114, and rollers 116, 118. The bristles of such rollers are resilient to the extent that the bristles are deflected by the weight of the stones and the stones pass between the pairs of rollers while the potatoes are carried on bristles to the end of the rollers where they are delivered to the conveyor 132 and thence upwardly for the length of the conveyor 132 and into the chute 144. The stones are carried on the conveyor 132 to the chute 142 and returned to the ground surface.

While only a single embodiment of the present invention has been shown and described, other embodiments are contemplated and numerous changes and modifications may be made therein without departing from the spirit of the invention as set forth in the appended claims.

What is claimed is:

1. In a potato harvesting apparatus, a mobile frame, a first endless conveyor positioned upon said frame so as to have an upper flight substantially parallel to said frame and mounted on said frame for traveling movement about spaced horizontal axes, a second endless conveyor arranged so as to extend exteriorly about said first conveyor and to have an upper flight spaced above and parallel to the upper flight of said first conveyor and mounted on said frame for traveling movement about other spaced horizontal axes, a third endless conveyor arranged so as to extend exteriorly about said second conveyor and to have an upper flight spaced above and parallel to the upper flight of said second conveyor and mounted on said frame for traveling movement about further spaced horizontal axes, said second and third conveyors being each fabricated of an endless band of mesh material with openings of the mesh material of said third conveyor being larger than the openings of the mesh of said second conveyor, an overhead delivery chute positioned adjacent the upper flight of said third conveyor and having the discharge end above the upper flight of said third conveyor inwardly of and adjacent one end of the last-mentioned flight, conveying means on said frame for delivering a mass of freshly gathered potatoes having stones associated therewith to said chute, a pair of brush rollers rotatable in opposite directions arranged in spaced side by side aligned relation positioned transversely of the upper flight of each of said first, second, and third conveyors, each of said pairs of rollers being disposed so that one of the complemental ends of said rollers are adjacent to and spaced below the other end of the complemental conveyor upper flight with the rollers sloping downwardly from the other end of the last-mentioned flight, and another conveying means connecting the other end of each of the upper flights of said conveyors to said one complemental end of said pairs of rollers for delivering the graded potato-stone portions to the respective pairs of rollers, the upper flight of said third conveyor upon having a mass of freshly gathered potatoes admixed with stones delivered thereon retaining thereon the potatoes and stones of a size larger than the mesh openings, permitting the potatoes and stones of a size smaller than the mesh openings to pass onto the upper flight of said second conveyor, and transporting the retained graded potato-stone portion to the other end of said upper flight, the upper flight of said second conveyor upon having the potatoes and stones of a size smaller than the mesh openings of said third conveyor received thereon retaining the potatoes and stones of a size larger than the mesh openings of said second conveyor, permitting the potatoes and stones of a size smaller than said mesh openings to pass onto the upper flight of said first conveyor, and transporting the retained graded potato-stone portion to the other end of said second conveyor upper flight, the upper flight of said first conveyor upon having the potatoes and stones of a size smaller than the mesh openings of said second conveyor received thereon retaining thereon said potatoes and stones and transporting the retained graded potato-stone portion to the other end of said first conveyor upper flight, said pairs of rollers upon having the graded potato-stone portions received thereon retaining and transporting the potatoes of the portions to the other ends thereof and permitting passage therethrough of the stones of said portions.

2. In a potato harvesting apparatus, a mobile frame, a first endless conveyor positioned upon said frame so as to have an upper flight substantially parallel to said frame and mounted on said frame for traveling movement about spaced horizontal axes, a second endless conveyor arranged so as to extend exteriorly about said first conveyor and to have an upper flight spaced above and parallel to the upper flight of said first conveyor and mounted on said frame for traveling movement about other spaced horizontal axes, a third endless conveyor arranged so as to extend exteriorly about said second conveyor and to have an upper flight spaced above and parallel to the upper flight of said second conveyor and mounted on said frame for traveling movement about further spaced horizontal axes, said second and third conveyors being each fabricated of an endless band of mesh material with openings of the mesh material of said third conveyor being larger than the openings of the mesh of said second conveyor, an overhead delivery chute positioned adjacent the upper flight of said third conveyor and having the discharge end above the upper flight of said third conveyor inwardly of and adjacent one end of the last-mentioned flight, conveying means on said frame for delivering a mass of freshly gathered potatoes having stones associated therewith to said chute, a pair of brush rollers rotatable in opposite directions arranged in spaced side by side aligned relation positioned transversely of the upper flight of each of said first, second, and third conveyors, each of said pairs of rollers being disposed so that one of the complemental ends of said rollers are adjacent to and spaced below the other end of the complemental conveyor upper flight with the rollers sloping downwardly from the other end of the last-mentioned flight, another conveying means connecting the other end of each of the upper flights of said conveyors to said one complemental end of said pairs of rollers for delivering the graded potato-stone portions to the respective pairs of rollers, the upper flight of said third conveyor upon having a mass of freshly gathered potatoes admixed with stones delivered thereon retaining thereon the potatoes and stones of a size larger than the mesh openings, permitting the potatoes and stones of a size smaller than the mesh openings to pass onto the upper flight of said second conveyor, and transporting the retained graded potato-stone portion to the other end of said upper flight, the upper flight of said second conveyor upon having the potatoes and stones of a size smaller than the mesh openings of said third conveyor received thereon retaining the potatoes and stones of a size larger than the mesh openings of said second conveyor, permitting the potatoes and stones of a size smaller than said mesh openings to pass onto the upper flight of said first conveyor, and transporting the retained graded potato-stone portion to the other end of said second conveyor upper flight, the upper flight of said first conveyor upon having the potatoes and stones of a size smaller than the mesh openings of said second conveyor received thereon retaining thereon said potatoes and stones and transporting the retained graded potato-stone portion to the other end of said first conveyor upper flight, said pairs of rollers upon having the graded potato-stone portions received thereon retaining and transporting the potatoes of the portions to the other ends thereof and permiting passage therethrough of the stones of said portions, a first common collecting means adjacent to and below and outwardly of the other of the complemental ends of said pairs of rollers for receiving the separated potatoes being discharged from said other ends, and a second common collecting means extending below all of said pairs of rollers for receiving the stones passing between the respective pairs of said rollers.

3. In a potato harvesting apparatus, a mobile frame, a first endless conveyor positioned upon said frame so as to have an upper flight substantially parallel to said frame and mounted on said frame for traveling movement about spaced horizontal axes, a second endless conveyor arranged so as to extend exteriorly about said first conveyor and to have an upper flight spaced above and parallel to the upper flight of said first conveyor and mounted on said frame for traveling movement about other spaced horizontal axes, a third endless conveyor arranged so as to extend exteriorly about said second conveyor and to have an upper flight spaced above and parallel to the upper flight of said second conveyor and mounted on said frame for traveling movement about further spaced horizontal axes, said second and third conveyors being each fabricated of an endless band of mesh material with openings of the mesh material of said third conveyor being larger than the openings of the mesh of said second conveyor, an overhead delivery chute positioned adjacent the upper flight of said third conveyor and having the discharge end above the upper flight of said third conveyor inwardly of and adjacent one end of the last-mentioned flight, conveying means on said frame for delivering a mass of freshly gathered potatoes having stones associated therewith to said chute, gathering means connected in communication with said conveying means for extracting a mass of freshly dug potatoes admixed with stones from a ground surface and delivering same to said conveying means, a pair of brush rollers rotatable in opposite directions arranged in spaced side by side aligned relation positioned transversely of the upper flight of each of said first, second, and third conveyors, each of said pairs of rollers being disposed so that one of the complemental ends of said rollers are adjacent to and spaced below the other end of the complemental conveyor upper flight with the rollers sloping downwardly from the other end of the last-mentioned flight, another conveying means connecting the other end of each of the upper flights of said conveyors to said one complemental end of said pairs of rollers for delivering the graded potato-stone portions to the respective pairs of rollers, the upper flight of said third conveyor upon having a mass of freshly gathered potatoes admixed with stones delivered thereon retaining thereon the potatoes and stones of a size larger than the mesh openings, permitting the potatoes and stones of a size smaller than the mesh openings to pass onto the upper flight of said second conveyor, and transporting the retained graded potato-stone portion to the other end of said upper flight, the upper flight of said second conveyor upon having the potatoes and stones of a size smaller than the mesh openings of said third conveyor received thereon retaining the potatoes and stones of a size larger than the mesh openings of said second conveyor, permitting the potatoes and stones of a size smaller than said mesh openings to pass onto the upper flight of said first conveyor, and transporting the retained graded potato-stone portion to the other end of said second conveyor upper flight, the upper flight of said first conveyor upon having the potatoes and stones of a size smaller than the mesh openings of said second conveyor received thereon retaining thereon said potatoes and stones and transporting the retained graded potato-stone portion to the other end of said first conveyor upper flight, said pairs of rollers upon having the graded potato-stone portions received thereon retaining and transporting the potatoes of the portions to the other ends thereof and permiting passage therethrough of the stones of said portions, a first common collecting means adjacent to and below and outwardly of the other of the complemental ends of said pairs of rollers for receiving the separated potatoes being discharged from said other ends, and a second common collecting means extending below all of said pairs of rollers for receiving the stones passing between the respective pairs of said rollers.

4. In a potato harvesting apparatus, a mobile frame, a first endless conveyor positioned upon said frame so as to have an upper flight substantially parallel to said frame and mounted on said frame for traveling movement about spaced horizontal axes, a second endless conveyor arranged so as to extend exteriorly about said first conveyor and to have an upper flight spaced above and parallel to the upper flight of said first conveyor and mounted on said frame for traveling movement about other spaced horizontal axes, a third endless conveyor arranged so as to extend exteriorly about said second conveyor and to have an upper flight spaced above and parallel to the upper flight of said second conveyor and mounted on said frame for traveling movement about further spaced horizontal axes, said second and third conveyors being each fabricated of an endless band of mesh material with openings of the mesh material of said third conveyor being larger than the openings of the mesh of said second conveyor, an overhead delivery chute positioned adjacent the upper flight of said third conveyor and having the discharge end above the upper flight of said third conveyor inwardly of and adjacent one end of the last-mentioned flight, conveying means on said frame for delivering a mass of freshly gathered potatoes having stones associated therewith to said chute, a pair of brush rollers rotatable in opposite directions arranged in spaced side by side aligned relation positioned transversely of the upper flight of each of said first, second, and third conveyors, each of said pairs of rollers being disposed so that one of the complemental ends of said rollers are adjacent to and spaced below the other end of the complemental conveyor upper flight with the rollers sloping downwardly from the other end of the last-mentioned flight, and another conveying means connecting the other end of each of the upper flights of said conveyors to said one complemental end of said pairs of rollers for delivering the graded potato-stone portions to the respective pairs of rollers, the upper flight of said third conveyor upon having a mass of freshly gathered potatoes admixed with stones delivered thereon retaining thereon the potatoes and stones of a size larger than the mesh openings, permitting the potatoes and stones of a size smaller than the mesh openings to pass onto the upper flight of said second conveyor, and transporting the retained graded potato-stone portion to the other end of said upper flight, the upper flight of said second conveyor upon having the potatoes and stones of a size smaller than the mesh openings of said third conveyor received thereon retaining the potatoes and stones of a size larger than the mesh openings of said second conveyor, permitting the potatoes and stones of a size smaller than said mesh openings to pass onto the upper flight of said first conveyor, and transporting the retained graded potato-stone portion to the other end of said second conveyor upper flight, the upper flight of said first conveyor upon having the potatoes and stones of a size smaller than the mesh openings of said second conveyor received thereon retaining thereon said potatoes and stones and transporting the retained graded potato-stone portion to the other end of said first conveyor upper flight, the bristles of each of said pairs of rollers being resilient to the extent that upon having the graded potato-stone portion received thereon said bristles are deflected by the weight of the stones to permit the stones to pass between said adjacent rollers and the potatoes of said portion are carried by said rollers to the other ends of the latter.

No references cited.